(12) United States Patent
Borgers et al.

(10) Patent No.: US 6,742,395 B1
(45) Date of Patent: *Jun. 1, 2004

(54) HERMETIC PRESSURE TRANSDUCER

(75) Inventors: Marc Gerard Johan Borgers, Enschede (NL); Thomas R. Maher, Rehoboth, MA (US); Timothy M. McBride, Sharon, MA (US); Paulus Thomas Johannes Gennissen, Enschede (NL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/324,473

(22) Filed: Dec. 20, 2002

(51) Int. Cl.$^7$ ................................................. G01L 9/12
(52) U.S. Cl. .............................. 73/717; 73/715; 73/716; 73/718; 73/720; 73/726
(58) Field of Search .......................... 73/717, 716, 718, 73/720, 726, 715, 756

(56) References Cited

U.S. PATENT DOCUMENTS 6,453,747 B1  9/2002  Weise et al.

OTHER PUBLICATIONS

Copending application Ser. No. 10/341,297 filed Jan. 13, 2002, Title: Hermetic Pressure Transducer, Inventor(s): David J. DiPaola et al.
Copending application Ser. No. 10/341,296 filed Jan. 13, 2003, Title: Hermetic Pressure Transducer, Inventor(s): David J. DiPaola.
Copending application Ser. No. 10/341,295 filed Jan. 13, 2003, Hermetic Pressure Transducer, Inventor(s): Peter A. Weise.
Copending application Ser. No. 10/341,298 filed Jan. 13, 2003, Title: Hermetic Pressure Transducer, Inventor(s): Hironari Ishiguro et al.

Primary Examiner—Edward Lefkowitz
Assistant Examiner—Andre Allen
(74) Attorney, Agent, or Firm—Frederick J. Telecky Jr.; Russell E. Baumann

(57) ABSTRACT

A port fitting (102) is formed with a closed, pedestal end forming a diaphragm (102a) on which a strain gauge sensor is mounted. A support member (106) is received on the pedestal end and is formed with a flat end wall (106a) having an aperture (106d) aligned with the sensor. A circuit assembly (108) is bonded to the flat end wall and the sensor wire bonded to the electronic circuit. A cover member (114) placed on the support member, is provided with a cavity for a metal shield member (118) fitted inside the cover member before assembly. The shield member is formed with spring members (118b) extending outside the perimeter of the cover member. The cover member is formed with circular cavities (114d) extending in an axial direction to provide seating for contact spring members (117), making electronic contact to the sensor electronics and protruding beyond the body of the cover member. The cover member is also fitted with a circular elastomer gasket member (116), providing an environmental seal. A connector member (120e), comprised of an integrally formed metal housing member (120a) and bent terminals (122a, 122b, 122c), is then placed over the cover member in such a manner that the terminals are aligned with the spring contact members, making electrical contact with the spring members. The bottom portion (120b) of the metal housing is welded to a support flange (104) of the port fitting while its top portion (120a) places a selected load on the elastomer seal member seated on the cover member of the transducer.

8 Claims, 8 Drawing Sheets

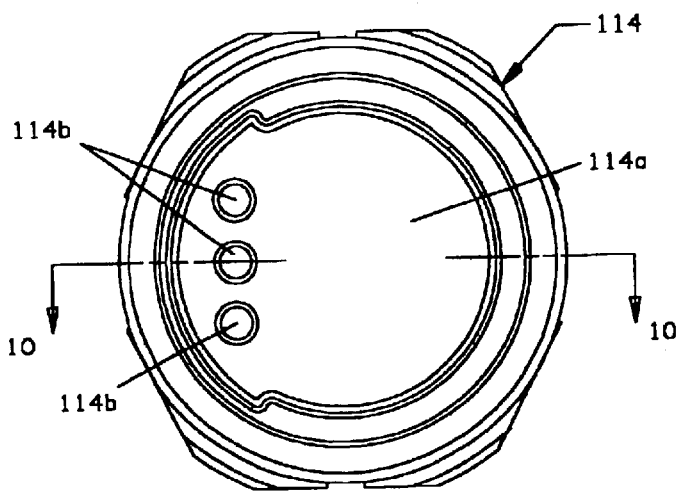
FIG. 9
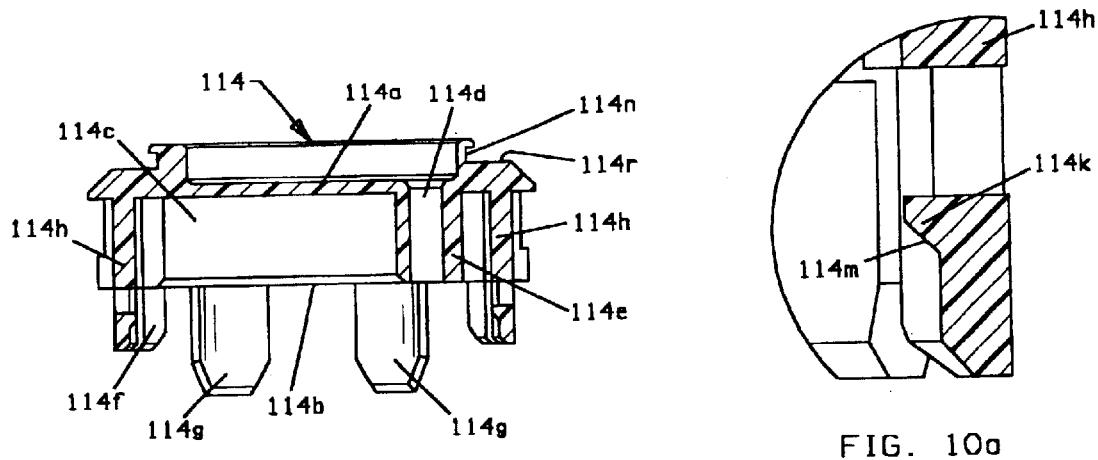
FIG. 10
FIG. 10a
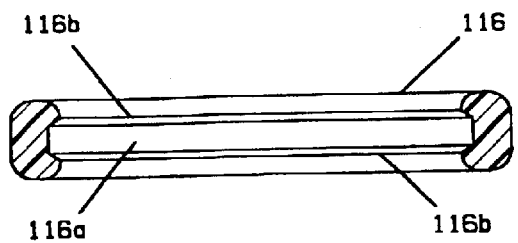
FIG. 11

HERMETIC PRESSURE TRANSDUCER

CROSS REFERENCE TO RELATED APPLICATIONS

Similar subject matter is contained in copending application Serial Nos. 10/341,297, 10/341,296, 10/341,298, assigned to the assignee of the present invention.

FIELD OF THE INVENTION

This invention relates generally to a pressure transducer using strain gauge technology for sensing pressure change to produce an electrical signal related to such change and employing electronics for processing and amplifying the signal and more particularly to improved structure for packaging such sensors.

BACKGROUND OF THE INVENTION

An example of a prior art pressure transducer using strain gauge technology for sensing pressure change of the type with which the invention is concerned is disclosed and claimed in U.S. Pat. No. 6,453,747, which issued Sep. 24, 2002 to the assignee of the present invention, the subject matter of which is incorporated herein by this reference. In that patent, a transducer is described having a tubular port fitting formed with a fluid receiving opening at one end and a closed, integrally formed diaphragm in at an opposite pedestal end. A support member having an apertured flat end wall is locked onto the pedestal end in a selected orientation; The aperture of the support member is in alignment with strain gauge sensor elements bonded to the diaphragm and a flexible circuit has a first lobe section for mounting electronic components bonded to the rigid, flat end surface of the support with an opening aligned with the aperture in the flat end wall. A second lobe section of the flexible circuit is placed on a seating surface of an adjacent inverted connector and terminals extending through apertures in the second lobe section are soldered to circuit pads on the flexible circuit. Wires are ultrasonically bonded both to the strain gauge sensor elements and to circuit pads on the first lobe section and encapsulated by silicone gel.

A cup-shaped EMC shield is received over the first lobe section and the connector is turned over bending the flexible circuit assembly into a U-shaped configuration with wall portions of the connector locking onto the support member. A metal housing is received over the connector applying a load to an O-ring gasket mounted between the housing and the connector with the housing welded to a support flange hermetically connected to the tubular port fitting. The EMC shield is provided with outwardly extending tabs which engage the inside wall of the housing to form an electrical connection therewith.

Although transducers made in accordance with the noted patent are highly effective and are widely used, it is desirable to lower the cost of producing such transducers to make them more economically feasible to use them on various applications and thus increase manufacturing volume with resulting savings in large volume manufacturing.

SUMMARY OF THE INVENTION

It is an object of the present invention to provide a reliable yet lower cost transducer than the prior art transducer noted above. Another object of the invention is the provision of a transducer which is more easily assembled. Yet another object of the invention is the provision of a transducer, particularly amenable for use with variously sized and shaped connector terminals.

Briefly described, in accordance with the invention, a tubular port fitting having a fluid receiving opening at one end and a closed, integrally formed diaphragm at an opposite pedestal end has an angular orientation feature and a locking feature for locking receipt of a support member in a selected angular orientation on the pedestal end. A radial extending mounting flange is hermetically welded to the port fitting to engage with the support member. The support member has an apertured flat end wall surface received on the diaphragm portion, the aperture being in alignment with strain gauge sensor elements glass bonded to the diaphragm portion. An electronic circuit comprising a suitable flexible circuit material or printed hard board for mounting electronic components, including an integrated circuit and landing zones for spring contact members. The circuit substrate is bonded to the rigid, flat end surface of the support member and formed with an opening aligned with the aperture in the flat surface. Wires are ultrasonically bonded both to the strain gauge sensor elements and to circuit pads on the bonded section of the flexible circuit assembly and then encapsulated by silicone gel.

A cover member is used to provide support for the spring contact members to position them for engagement with the landing zones of the circuit substrate. The spring elements are enclosed within longitudinally extending cavities in the cover member aligned with the landing zones when the cover is attached to the support member. An elastomer environmental seal or gasket member is enclosed in a circumferential groove in the surface of the cover member. A cup-shaped EMC shield is received in a chamber formed on one side of the cover member, the shield provided with tabs which extend outwardly through openings in the sidewall of the cover member beyond the outer periphery of the sidewall. The cover member is provided with wall portions which lock onto the support member. Electrical spring contact members received in the longitudinal cavities in the cover member have one end protruding from the cover member to enable engagement with connector terminal ends with the opposite ends received on respective landing zones.

A hexagonal metal housing member combined with the body of the connector by means of insert molding has bent portions of terminals acting as contact landing zones for electrical connection with the contact spring members disposed in the cover member. The EMC shield tabs are spring biased into electrical connection with the metal housing member and with the housing member and connector applying a selected load to the elastomer gasket member placed in the circumferential groove formed in the sidewall of the cover member, the housing being welded around its lower periphery to the support flange to form a fluid seal and to maintain the loading on the elastomer gasket member.

Additional objects, features and methods of the invention will be set forth in part in the description which follows and in part will be obvious from the description. The objects and advantages of the invention may be realized and attained by means of the instrumentalities, combinations and methods particularly pointed out in the appended claims.

BRIEF DESCRIPTION OF THE DRAWINGS

The accompanying drawings which are incorporated in and constitute a part of the specification, illustrate preferred embodiments of the invention and, together with the description, serve to explain the objects, advantages and principles of the invention. In the drawings:

FIG. 9 is a top plan view of a cover member used in the FIG. 4 transducer;

FIG. 10 is a cross sectional view taken on line 10—10 of FIG. 9;

FIG. 10a is an enlarged fragmentary view of a portion of FIG. 10;

FIG. 11 is a cross sectional view of a gasket member used in the FIG. 4 transducer;

DETAILED DESCRIPTION OF PREFERRED EMBODIMENTS

Figure 1:
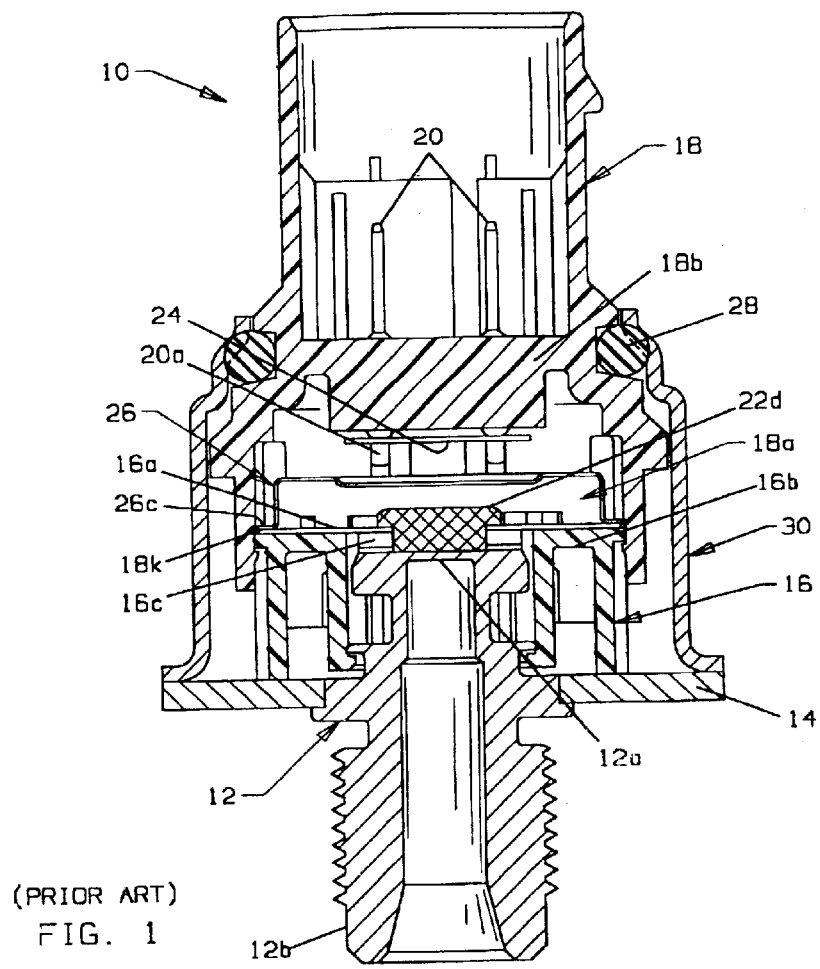
FIG. 1 is a cross sectional view taken on line 1—1 of FIG. 2 of a prior art transducer and FIG. 2 is a top plan view of the FIG. 1 structure.

As noted above, FIGS. 1 and 2 relate to a prior art transducer, specifically a transducer as disclosed in U.S. Pat. No. 6,453,747 which will be briefly described to facilitate the ensuing description of the preferred embodiments of the invention.

The prior art transducer 10 comprises a metallic port fitting 12 having a first closed pedestal end with an integrally formed diaphragm portion 12a, and an elongated, open, coupling end 12b. A support flange 14 is fixedly attached to the port fitting as by hermetically welding thereto. A support member 16 is disposed over the pedestal end and received on the support flange in a selected angular orientation and locked to the pedestal end. The support member is provided with an end wall 16b having a flat surface 16a formed with an aperture 16c therethrough aligned with a central portion of the diaphragm member. A connector 18 formed of electrically-insulative material and mounting terminals 20 in body portion 18b is disposed on the support member with a circuit or electronic receiving chamber 18a formed between the connector and the support member and with an EMC shield 26 received in the cavity. A seating shelf 18k in the sidewall of the connector receives ledges formed in the support member and captures a flange 26c of the EMC shield. The EMC shield is provided with spring tabs extending through openings in the sidewall of the connector. An O-ring 28 is received in a seating groove formed in the connector with a metallic housing member 30 welded to the support flange and placing a selected sealing load on the O-ring and with the EMC shield tabs biased into engagement with the inside surface of the housing.

A sensor assembly comprising strain gauge elements are attached to the diaphragm portion by glass material and electrically connected to a flexible circuit assembly 24 and encapsulated by electrically insulating silicone gel 22d. The flexible circuit is generally U-shaped with a first lobe bonded to the flat surface 16a of the support member and a second overlying lobe receiving terminal ends 20a through apertures in the second lobe and electrically connected to circuit paths in the second lobe by soldering.

Figure 2:
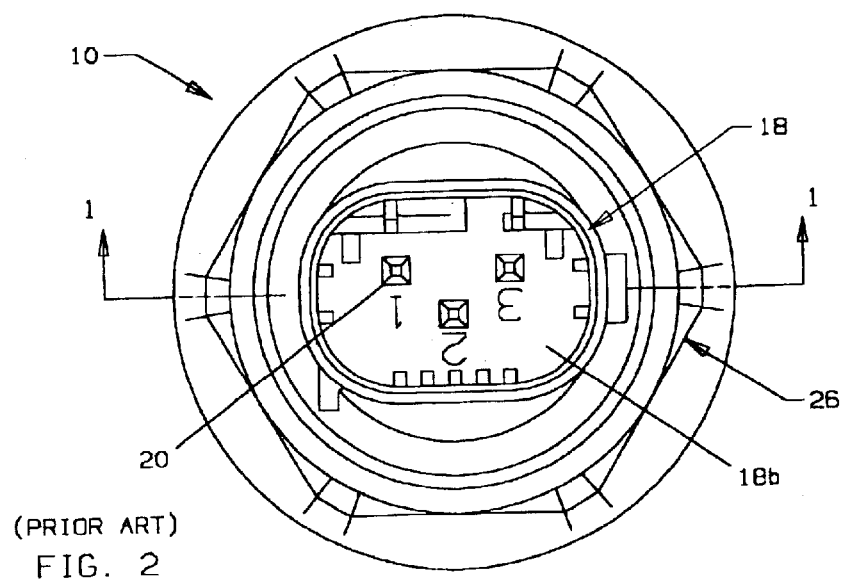
Figure 3:
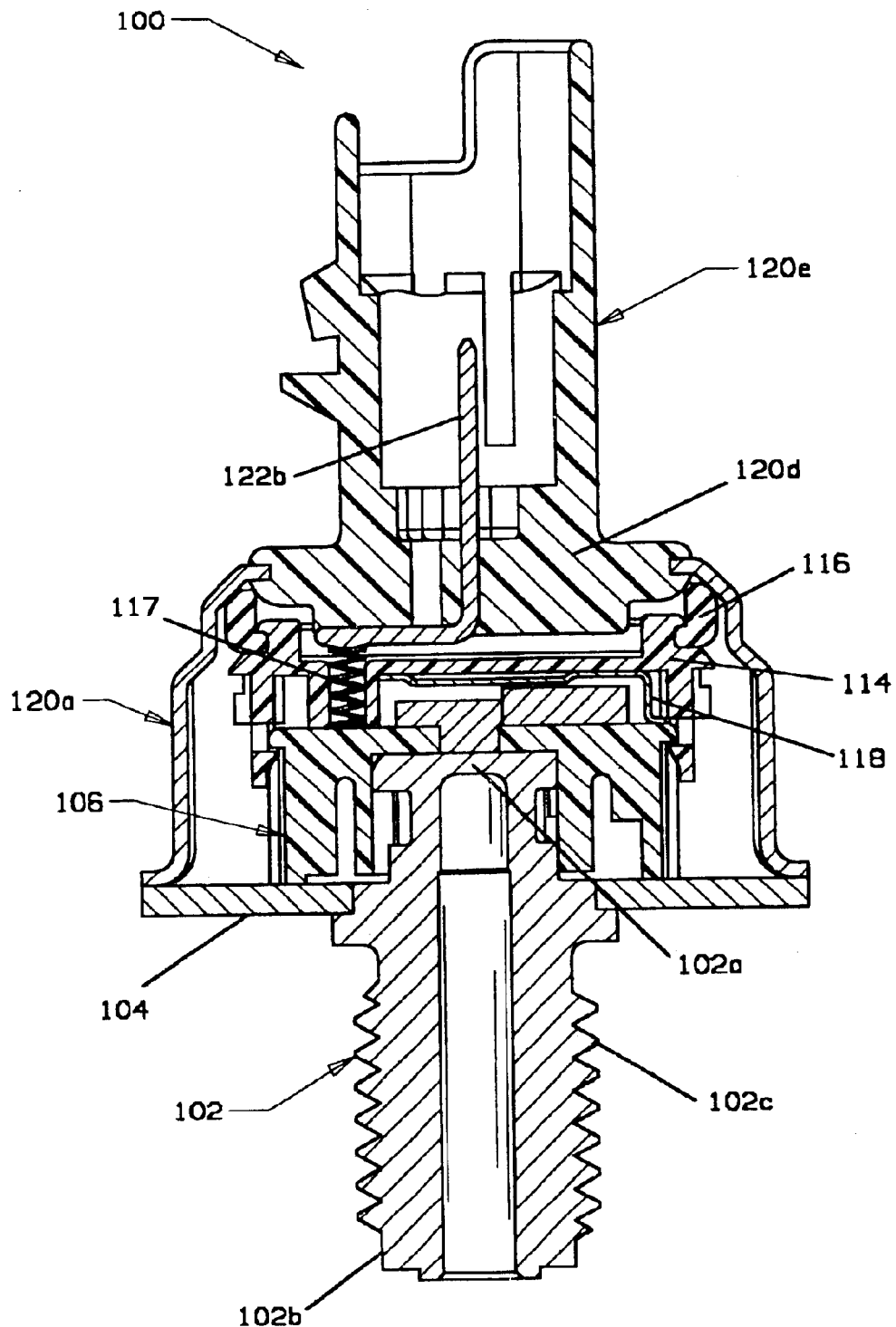
FIG. 3 is a cross sectional view taken on line—of FIG. 4 of a transducer made in accordance with a first preferred embodiment of the invention and FIG. 4 is a top plan view of FIG. 3 structure.
Figure 4:
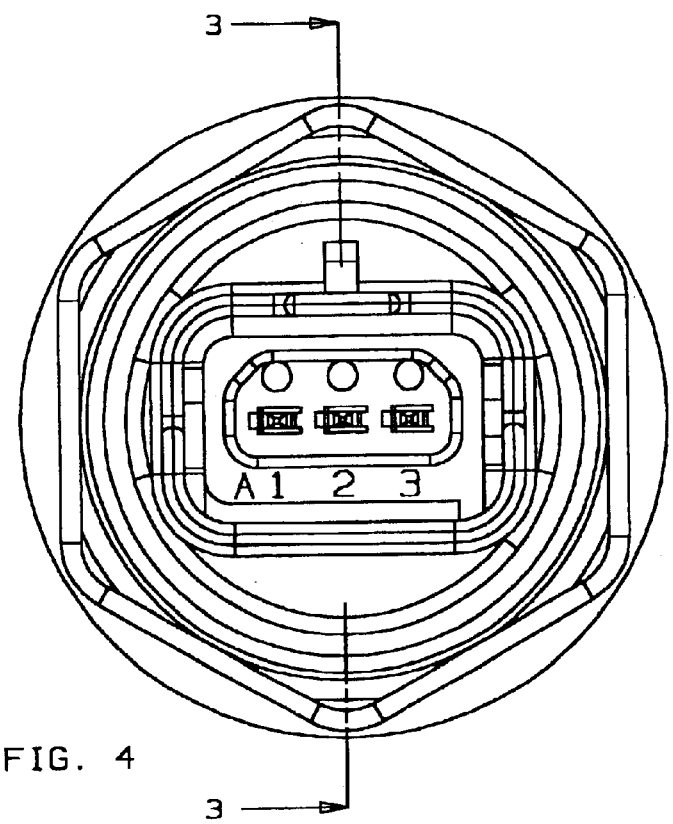
Figure 5:
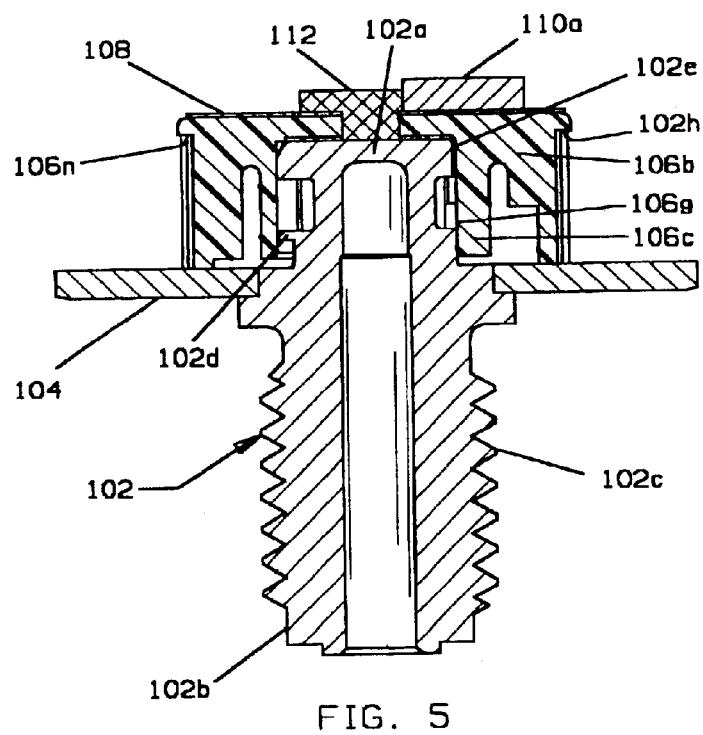
FIG. 5 is a cross sectional view similar to that of FIG. 3 of a portion of the transducer with the cover member, EMC shield and connector removed for purposes of illustration.

Turning now to FIGS. 3 and 5, a pressure sensing transducer 100 made in accordance with a preferred embodiment of the invention comprises a metallic port fitting 102 having a closed end 102a forming a diaphragm as in the FIG. 1 structure and an open, fluid pressure receiving end 102b. Suitable coupling means, such as threads 102c are provided on port fitting 102 for mounting the transducer to a fluid pressure source to be monitored. A metal support flange 104 is welded to tubular fitting 102 intermediate to its opposite ends forming an hermetic connection.

Figure 6:
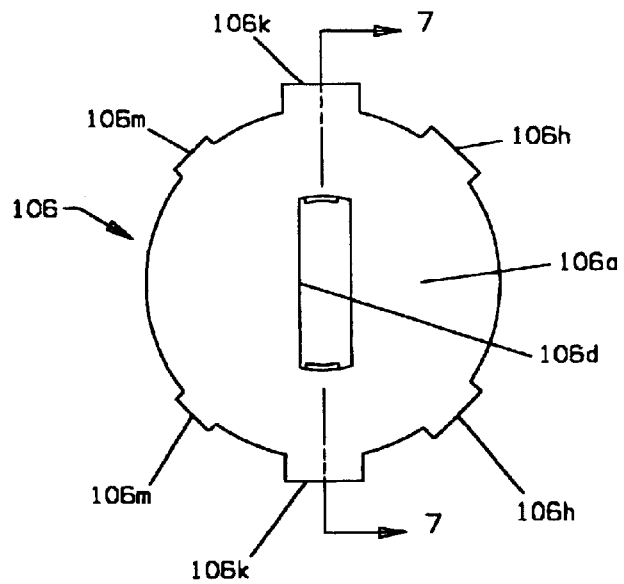
FIG. 6 is a top plan view of a support member receivable on the port fitting of the transducer.
Figure 7:
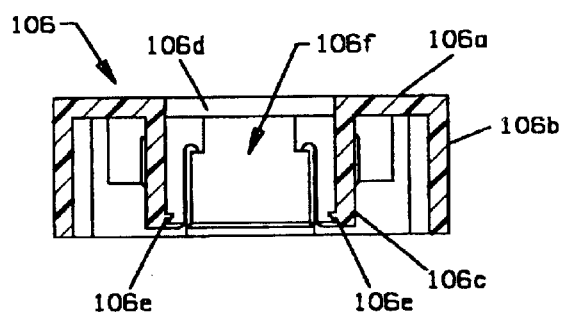
FIG. 7 is a cross sectional view taken on line 7—7 of FIG. 6.
Figure 8:
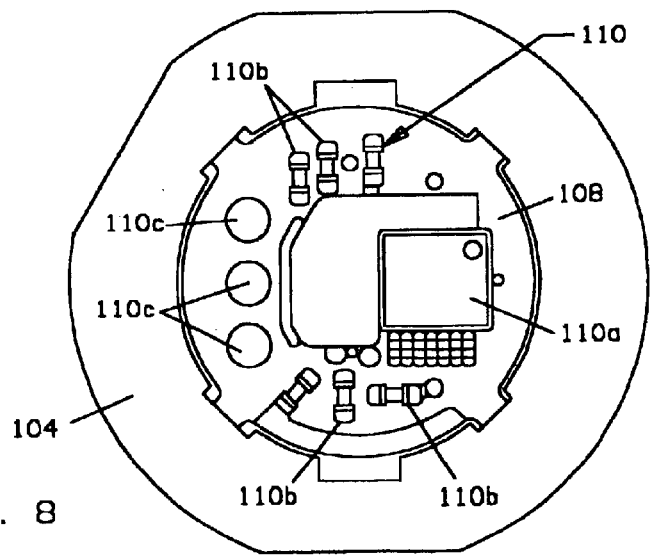
FIG. 8 is a top plan view of FIG. 5.

As best seen in FIGS. 5–7, a support member 106 formed of suitable electrically insulative material has a flat, rigid top wall 106a, an outer sidewall 106b and an inner sidewall 106c. An elongated slot 106d is formed in top wall 106a. A circuit board 108 (sees FIGS. 5 and 8) of any suitable type such as a flexible circuit or hard board circuit, is adhered to top flat surface of wall 106a and is provided with an electronic circuit 110 comprising IC 110a and electronic components 110b suitably connected by circuit paths (not shown for the sake of convenience). Three generally circular contact pads or contact spring landing zones 110c are also formed on circuit board 108.

The inner sidewall 106c is formed with longitudinally extending slots to form individual legs having a catch 106e for locking engagement with a radially extending flange 102d of tubular port 102. A tubular port receiving recess 106f is formed by inner wall 106c which includes a flat angular orientation portion 106g which is received on a flat surface portion 102e of the tubular port fitting. The outer wall 106b has a length which extends beyond that of the inner wall and is received on support flange 104. The outer wall 106b is formed with spaced apart angular orientation surface projections 106h, 106k and 106m along with spaced apart ledges 106n for use with a cover member to be described.

Support member 106 is placed on the closed end of tubular fitting 102 as shown in FIG. 5 locked thereto by means of catches 106e and with slot 106d aligned with sensor elements on diaphragm 102a (not shown). As in the FIGS. 1, 2 structure, the sensor elements are bonded to the exterior surface of diaphragm 102a and wire bonded to conductive pads on circuit board 108 and encapsulated with electrically insulative silicone gel 112.

With particular reference to FIGS. 9 and 10, a cover member 114 formed of suitable electrically insulative material comprising a body portion having a top wall 114a and a sidewall 114b forming a cavity 114c. Contact spring receiving apertures 114d are formed through top wall 114a and are provided with spring retaining tubular walls 114e depending downwardly therefrom, with reference to, FIG. 10, into the cavity generally coextensive with sidewall 114b. Apertures 114d and tubular walls 114e are common in number with contact spring landing zones 110c of circuit board 108 and alignable therewith when the cover member is received on support member 106, as will be described.

Cover member 114 has a plurality of spaced apart legs depending from the outer peripheral portion of the cover member including legs 114f, 114g and 114h. Legs 114f and 114g are arranged to be closely received on the outside periphery of the support member between angular surface projections of the support member. Legs 114h are also positioned to be received on the outside periphery of the support member and are formed with a catch 114k having an inclined inwardly facing camming surface 114m which extends radially inwardly beyond the outer edge of ledge 106n. When the cover member is placed on the support member, the camming surface 114m will ride on the outer periphery of top wall 106a forcing legs 114h outwardly until catch 114k is received under ledge 106n to lock cover member 114 to support member 106.

A generally circular gasket receiving groove 114n and seat 114r, respectively, are formed around the outer periphery of wall 114a. A circular annular gasket 116 is formed with a recess 116a extending around the inside diameter thereby forming upper and lower radially inwardly extending projections 116b. Gasket 116 is placed on seat 114r of cover member 114 with one circular projection received and retained in groove 114n.

Figure 13:
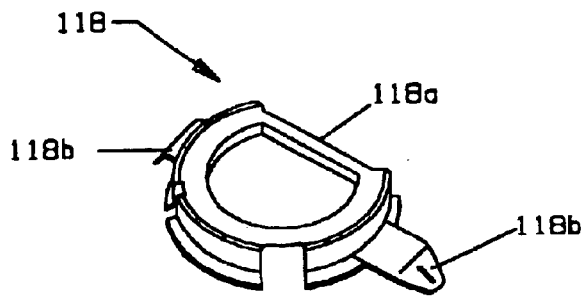
FIG. 13 is a perspective view of reduced scale of an EMC shield used in the FIG. 4 transducer.
Figure 14:
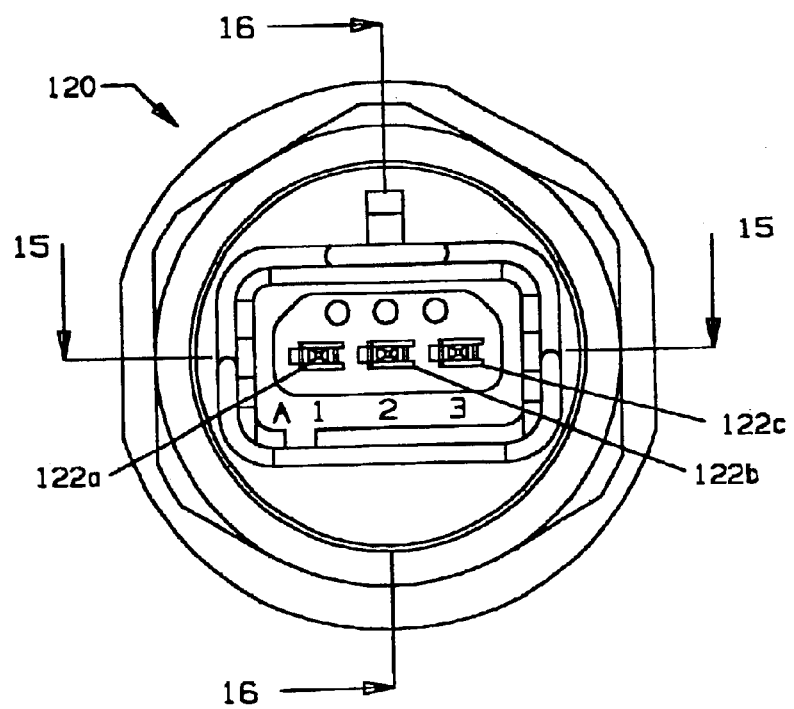
FIG. 14 is a top plan view of an integrally formed connector and housing member used in the FIG. 4 transducer.
Figure 15:
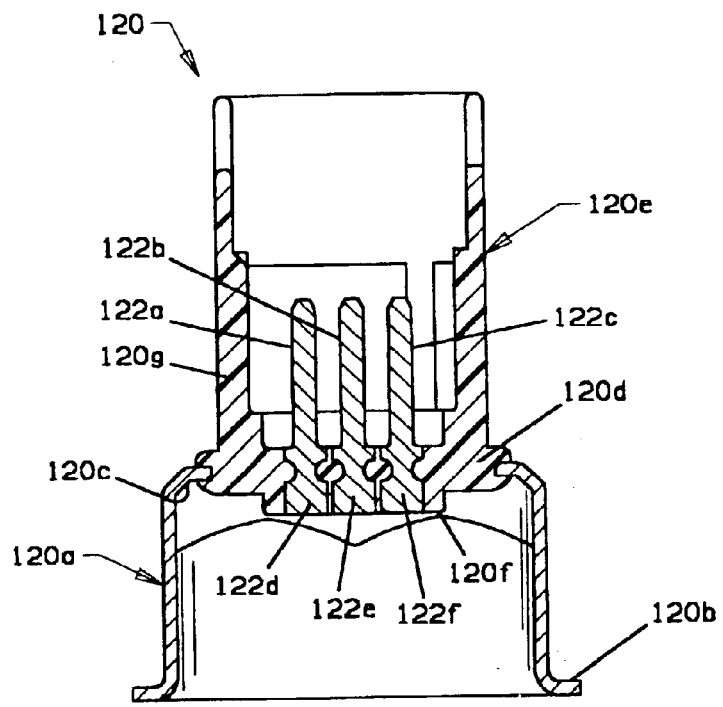
FIG. 15 is a cross sectional view taken on line 15—15 of FIG. 14.
Figure 16:
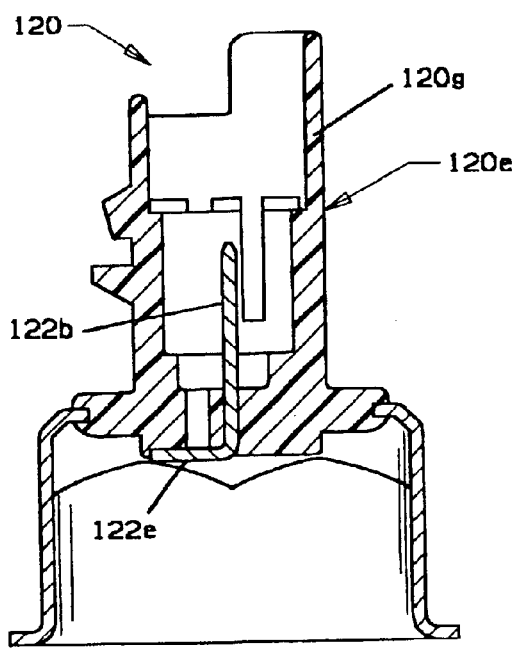
FIG. 16 is a cross sectional view taken on line 16—16 of FIG. 14.
Figure 17:
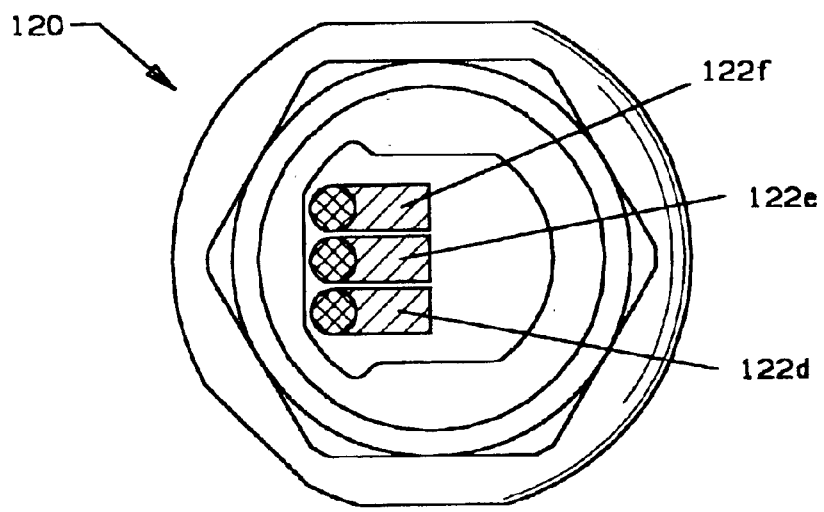
FIG. 17 is a bottom plan view of the FIG. 14 structure.

An EMC shield 118, shown in FIG. 13, is received in cavity 114c of the body portion of cover member 114 and is generally cup-shaped formed of electrically conductive material having a cut-off portion at 118a to accommodate tubular walls 114e. The shield is formed with opposed, outwardly extending spring tabs 118a which are arranged to extend between and downwardly from legs of cover member 114.

Figure 12:
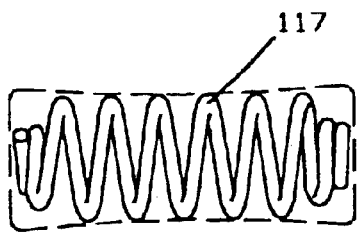
FIG. 12 is an elevational view of a contact spring used in the FIG. 4 transducer.

Cover member 114, with shield 118 in cavity 114c is locked onto support member 106 with a selected angular orientation and with tubular walls 114e in alignment with contact landing zones 110c of circuit board 108. A contact spring member 117, shown in FIG. 12, is placed in the bore of each tubular wall 114e of the cover member and extending substantially above and somewhat below the cover member body. Contact springs 117 are configured as helical coil springs formed of suitable electrically conductive material, preferably plated with precious metal to optimize conductivity. Springs 117 have an outer diameter which closely fits in the bores. The last two turns at each opposite end are preferably formed with a diminishing taper to provide a smaller contact surface end portion.

An integrally formed, as by injection molding, combined electrically insulative connector and metallic housing member 120, shown best in FIGS. 14–17, comprises a housing portion 120a preferably having a suitable polygonal, such as hexagonal, sidewall to facilitate handling and installation of the transducer at a selected pressure source site and removal therefrom. The housing portion 120a is formed with a radially outwardly extending flange 120b at the distal free end for welding attachment to support flange 104 and a circular preferably inclined sealing surface 120c at its opposite end.

Housing portion 120a is connected to the base 120d of connector portion 120e and mounts terminals 122a, 122b and 122c which extend through base 120d in spaced apart relation with the entire assembly preferably insert molded, i.e., the terminals and housing portion 120a in connector portion 120e. In the preferred embodiments, the terminals are each formed with a lower platform surface 122d, 122e, 122f, respectively, which are bent approximately ninety degrees relative to the elongated pin portions of the terminals and extend essentially parallel to the bottom surface 120f of base 120d to provide a contact engagement surface. A generally tubular shroud portion 120g extends upwardly from base 120d forming a protective enclosure for the terminals. If desired, potting material (not shown) can be placed at the bottom of the wall formed by shroud 120 around the bottom portion of the protruding terminal members to provide an improved environmental seal.

The integral connector/housing member 120 is placed over cover member 114 angularly oriented using suitable orientation means and having gasket 116 mounted on seat 114r and springs 117 projecting upwardly beyond the cover member. Member 120 is forced down into contact with support flange 104 compressing gasket 116 against seating surface 120c of housing portion 120a and with spring members 117 aligned with and engaging contact landing zones 112d, 122e and 122f, respectively, at one end thereof and contact spring landing zones 110c on circuit board 108 at the other end of the spring members. In this compressed condition with a selected load on the gasket, flange 120b is welded around its periphery to support flange 104.

Figure 18:
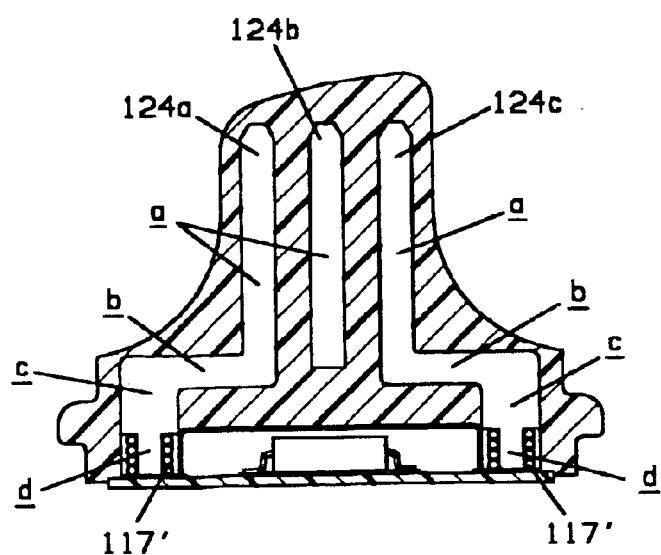
FIG. 18 is a broken away cross sectional view of a modified connector terminal ad contact spring arrangement.

FIG. 18 shows a modified terminal structure in which terminals 124a, 124b and 124c are each formed with a first elongated pin portion a extending along a longitudinal axis, a transversely extending portion b forming an angle generally ninety degrees with portion a and an offset portion c extending generally parallel to portion a and having a centralized prong d projecting from the end of portion c for receipt in one end of contact spring member 117' which has at least one end having a normal coil diameter. Portions b, c and d of terminal 124b are hidden in FIG. 18. It will be understood that the terminals could be formed in any selected configuration having a prong d at an end thereof for reception in one end of a contact spring.

Although the invention has been described with regard to specific preferred embodiments thereof, variations and modifications will become apparent to those skilled in the art. It is, therefore, the intention that the appended claims be interpreted as broadly as possible in view of the prior art to include all such variations and modifications.

What is claimed:

1. A pressure transducer comprising
   a generally tubular port fitting having a closed pedestal end with a diaphragm portion, an elongated coupling portion for mounting the transducer to a fluid pressure source to be monitored, a support flange extending radially outwardly from the port fitting intermediate to the pedestal end and the coupling portion,
   a support member received on the pedestal end, the support member having a flat, relatively rigid end surface formed with an aperture therethrough aligned with a central portion of the diaphragm portion,
   a circuit board adhered to-the end surface of the support member, the circuit board having an aperture aligned with the aperture of the support member, the circuit board having electronic components and having spaced apart electrically conductive spring contact pads,
   a cover member formed over the support member having a top wall and sidewalls forming a cavity, the sidewalls attached to the support member with the cavity aligned with the electronic components, a respective contact spring receiving opening formed in the top wall in alignment with each spring contact pad, an electrically conductive contact coil spring having first and second ends received in each contact spring receiving opening with the first end engaging a respective spring contact pad and the second end disposed at a location above the cover member, a housing member connected to the support flange and including a connector having a portion disposed above the cover member, the connector mounting spaced apart terminals extending through the connector, the terminals formed with a contact surface aligned and in engagement with the second end of a respective contact spring.

2. A pressure transducer according to claim 1 in which the contact surface of the terminals comprises a generally flat surface lying in a plane generally parallel to the flat end surface of the support member.

3. A pressure transducer according to claim 1 in which the coil of the spring members has a selected outer diameter and the coil of the spring members are tapered at each end thereof with a decreasing diameter.

4. A pressure transducer according to claim 3 in which the spring receiving openings in the top wall of the cover member is formed by tubular walls extending from respective openings in the top wall.

5. A pressure transducer according to claim 1 in which the contact surface of the terminals each comprises a downwardly extending wedge-shaped prong receivable in an end of a respective coil spring member.

6. A pressure transducer according to claim 1 in which the housing member and the connector are integrally formed.

7. A pressure transducer according to claim 1 further comprising an endless gasket seat formed around the periphery of the cover aligned with a sealing surface formed on the said portion of the housing member and a gasket is disposed in the gasket seat and in, engagement with the sealing surface of the housing member.

8. A pressure transducer according to claim 7 in which the endless gasket of the cover member comprises a laterally open circular groove formed in the cover member and the gasket is generally circular having an inside diameter formed with a groove defining radially inwardly extending spaced apart circular projections, one circular projection being received in the laterally open circular groove in the cover member.

* * * * *